US005554678A

United States Patent [19]

Katsumata et al.

[11] Patent Number: 5,554,678

[45] Date of Patent: Sep. 10, 1996

[54] ELECTROMAGNETIC SHIELDING COMPOSITE

[75] Inventors: Makoto Katsumata; Hidenori Yamanashi; Hitoshi Ushijima, all of Gotenba, Japan

[73] Assignee: Yazaki Corporation, Tokyo, Japan

[21] Appl. No.: 429,473

[22] Filed: Apr. 27, 1995

[30] Foreign Application Priority Data

May 19, 1994 [JP] Japan .................................... 6-105248

[51] Int. Cl.$^6$ ........................................................ C08K 3/00

[52] U.S. Cl. .......................... 524/495; 524/439; 524/440; 524/441; 524/492; 524/493; 524/494; 524/496

[58] Field of Search .................................... 524/495, 496, 524/492, 493, 494, 439, 440, 441

[56] References Cited

U.S. PATENT DOCUMENTS

| | | | |
|---|---|---|---|
| 4,538,151 | 8/1985 | Hatakeyama et al. . | |
| 5,373,046 | 12/1994 | Okamura et al. | 524/413 |

FOREIGN PATENT DOCUMENTS

| | | |
|---|---|---|
| 0122243 | 10/1984 | European Pat. Off. . |
| 0339146A1 | 11/1989 | European Pat. Off. . |
| 0394207A1 | 10/1990 | European Pat. Off. . |
| 0420513A1 | 4/1991 | European Pat. Off. . |
| 1406050 | 10/1968 | Germany . |
| 3802150A1 | 1/1989 | Germany . |
| 2234857A | 2/1991 | Germany . |
| 4101869A1 | 7/1992 | Germany . |
| 4201871A1 | 9/1992 | Germany . |
| 2-213002 | 8/1990 | Japan . |

*Primary Examiner*—Edward J. Cain
*Attorney, Agent, or Firm*—Nikaido, Marmelstein, Murray & Oram LLP

[57] ABSTRACT

An electromagnetic shielding composite containing a thermosplastic synthetic resin mixed with a metal conductive fiber, low melting point metal, and a vapor-phase grown carbon fiber, which preferably includes, to the total weight of the composite, a thermoplastic synthetic resin of 40–90 weight %, a metal conductive fiber of 0.5–30 weight % and a vapor-phase grown carbon fiber of 0.5–50 weight %.

13 Claims, 1 Drawing Sheet

ELECTROMAGNETIC SHIELDING COMPOSITE

BACKGROUND OF THE INVENTION

1. Field of the Invention

The present invention relates to materials for producing electromagnetic shielding members surrounding electromagnetic-wave generating equipment, electronic equipment which is sensitive to external electromagnetic waves, or the like.

2. Prior Art

Up to now, in electrical communication equipment and the like, housings thereof have been made of metals with a character of electromagnetic shielding in order to prevent wrong operations due to external electromagnetic waves. However, it is not only difficult to construct such shields but it also brings a weight increase to mold a complicated-shaped member out of metal. Consequently, various methods for adding a character of electromagnetic shielding to easily molded plastic materials have been proposed.

One of such composites with a character of electromagnetic shielding is a composite material made by mixing with a conductive fiber or a conductive powder with a plastic, and, for example, in Japanese Patent Preliminary Publication No. Hei 2-213002 is disclosed a composite, wherein metal conductive fibers coated by low melting point metals are included and dispersed in a thermoplastic synthetic resin.

The injection molding of this material can produce molded articles with an appropriate conductivity, because the conductive fibers dispersed in their molded bodies are constructed such that the fibers are fusion-bonded to each other by means of the low melting point metal coating thereon. But, though such molded articles have a sufficient effect of electromagnetic shielding in a low-frequency range, they have a drawback of an insufficient shielding in a high-frequency range.

SUMMARY OF THE INVENTION

It is therefore an object of the present invention to eliminate the problem encountered in the prior art material and to provide an electromagnetic shielding composite, wherein molded articles with a sufficient electromagnetic shielding effect even in the high-frequency range can be obtained.

The object of the present invention can be accomplished by making use of an electromagnetic shielding composite, which comprises a thermoplastic synthetic resin mixed with a metal conductive fiber, a low melting point metal, and a vapor-phase grown carbon fiber.

In the electromagnetic shielding composite according to the present invention, the metal conductive fiber may be a fiber made of a conductive metal, such as copper, brass, aluminum, nickel, and stainless steel. Further, the metal conductive fiber may be one which is made of one of inorganic materials, such as glass/potassium titanate, wherein the surface of the fiber is metallized with a conductive metal, such as copper. Preferably, the fiber is not longer than 10 mm and its normal diameter is 5–100 μm. Moreover, the metal conductive fiber comprises 0.5–30 weight % of the total weight of the composite. When the metal conductive fiber constitutes less than 0.5 weight % of the composite, a sufficient effect of electromagnetic shielding can not be obtained, and when the conductive fiber is more than 30 weight %, the moldability deteriorates to result in an uneven dispersion of the fibers, which then can not provide a practical molded article.

In the electromagnetic shielding composite according to the present invention, the low melting point metal is one of metals which has a melting point between the molding temperature of the molded material and the temperature of the same in use, and, for example, materials having a 100°–250° C. melting point, such as tin or a tin-lead group alloy, are preferably utilized.

The low melting point metal is desirably mixed in such a quantity as can fusion-bond the metal conductive fibers to each other. If the quantity is too much, it will result in an undesirable heavy weight of the molded material. Consequently, normally the low melting point metal is preferably used in a 0.05–0.3:1 weight ratio to the metal conductive fiber.

Further, a vapor-phase grown carbon fiber is used in the electromagnetic shielding composite according to the present invention. These fibers can be made for example, under such a metal catalyst such as super-fine-grained iron or nickel, and an aromatic or aliphatic organic compound, such as benzene or butane, which are supplied into a chemical reaction space at a temperature of, for example, 900°–1,500° C., in the company of a carrier gas, such as hydrogen. A carbon fiber thus obtained by thermal decomposition may be additionally graphitized by a heat treatment at a temperature of 2,000°–3,500° C. Preferably, the vapor-phase grown carbon fiber is 10–500 μm long and its diameter is 0.1–1 μm. The vapor-phase grown carbon fiber is preferably mixed into the composition in a 0.5–50 weight % to the total weight of the composite. When the vapor-phase grown carbon fiber comprises less than 0.5 weight % to the composite, a sufficient effect of electromagnetic shielding can not be obtained in a high-frequency range, and when the fiber is more than 50 weight %, the moldability deteriorates to result in being impractical.

Moreover, a thermoplastic synthetic resin applied to the electromagnetic shielding composite according to the present invention is a resin, such as polyethylene, polypropylene, polystyrene, polyhalogenide vinyl, polyacrylate, ABS, polyphenylene oxide, polybutadiene oxide, polyester, and polycarbonate, but not limited to them. The thermoplastic synthetic resin preferably comprise 40–90 weight % to the total weight of the composite is preferably utilized. When the resin of less than 40 weight % is utilized, its molding is difficult, while, when the resin is more than 90 weight %, the effect of electromagnetic shielding decreases.

To the electromagnetic shielding composite according to the present invention, an anti-oxidizing agent, a pigment, and a filler may be added, if required, in addition to the above-mentioned components. Further, for a better wettability in respect of the low melting point metal and the metal conductive fiber, an appropriate flux may be added.

In the electromagnetic shielding composite according to the present invention, for example, a low melting point metal is preliminarily fusion-bonded on a surface of a metal conductive fiber, and then the fiber is mixed with a part of a thermoplastic synthetic resin to obtain a master batch.

Then, the master batch is mixed with another master batch which is a mixture of a vapor-phase grown carbon fiber and a part of a thermoplastic synthetic resin, so as to produce the composite. Thus produced composite may be used to make electromagnetic shielding according to the present invention, for example, by such a molding process as injection molding. It can be directly molded to the shape of a housing, a panel or the like for electronic equipment, or it can be preliminarily molded to a sheet-form and, then pressed to form a desired shape.

In use, the composite for electromagnetic shielding according to the present invention can be molded to a desired shape by normal plastic molding means, and also can be utilized to provide molded articles having a sufficient electromagnetic shielding effect in a wide frequency range.

BRIEF DESCRIPTION OF THE ACCOMPANYING DRAWING

FIG. 1 is a schematic diagram showing the elements of a device for measuring electromagnetic wave shielding performance.

DESCRIPTION OF PREFERRED EMBODIMENTS

Figure 1:
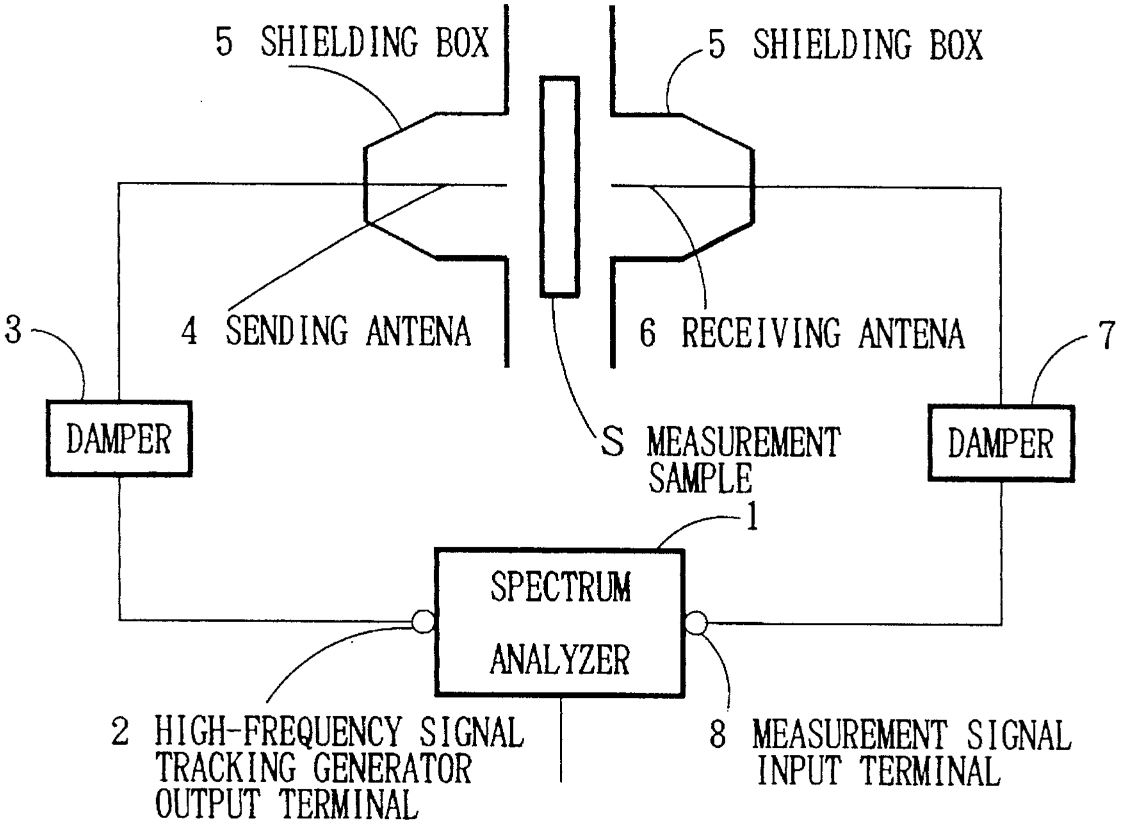

Through a molten bath of one of tin-lead solder group alloys including lead of 40 weight %, a copper fiber having a diameter of 50 μm is passed to obtain a metal conductive fiber coated by a solder alloy comprising 20% of the fiber weight. Next, a bundle of the fibers of 200 in number is delivered to a torpedo in an extruding machine to obtain a strand coated by polypropylene (HIPOL J940 produced by Mitsui Petrochemical Corp.). Further, the strand is cut into 5 mm long pieces to obtain a pelletizing master batch A of the metal conductive fiber. This master batch A includes a metal conductive fiber of 50 weight % and a low melting point metal of 10 weight %, the other component being polypropylene of 40 weight %.

While, in a vertical pipe-shaped electric furnace with a temperature of 1,000°–1,100° C., iron fine particles having a diameter of 100–300 Å are suspended, and a mixed gas of benzene and hydrogen is introduced therein to obtain carbon fibers, each of which is 10–1,000 μm long and has a diameter of 0.1–0.5 μm. Next, the carbon fibers are crushed by a ball mill and further graphatized by heat-processing to a temperature of 2,600° C. for a 30 minutes period under an argon atmosphere to obtain a powdery vapor-phase grown carbon fiber having a length of 10–100 μm.

Thus obtained vapor-phase grown carbon fiber of 60 weight units and the aforementioned polypropylene of 40 weight units are mixed and delivered to a mixing extrusion machine to produce a master batch B of a pelletized carbon fiber having a grain diameter of about 5 mm.

Moreover, for comparison, in place of the aforementioned vapor-phase grown carbon fiber, a conductive carbon black (KETJEN-BLACK EC, made by Akuzo Japan Corp.) of 40 weight % or a powdery graphite (SPG40, made by Nippon Crucible Corp.) of 60 weight % or a PAN-group carbon fiber (TORAYCA MLD300, made by Toray Industries Corp.) of 60 weight % may be mixed and kneaded with polypropylene to produce each of master batches a, b, and c.

After each of these master batches is mixed with the afore-mentioned polypropylene C, each of the pelletized composites having the compounding compositions as shown in Table 1 is produced by a mixing extrusion machine. Further, regarding to these composite, injection molding tests using testing dies are carried out. The test results are classified in the following four grades of moldability, which are shown in Table 2.

TABLE 1

| | Blending Ratio (%) | | | | | | Composition (%) | | | | | | |
|---|---|---|---|---|---|---|---|---|---|---|---|---|---|
| No. | A | B | C | a | b | c | MF | LM | VGCF | CB | GR | PACF | SR |
| 1* | 100 | | | | | | 50 | 10 | | | | | 40 |
| 2* | | 100 | | | | | | | 60 | | | | 40 |
| 3* | 40 | | 60 | | | | 20 | 4 | | | | | 76 |
| 4* | | 50 | 50 | | | | | | 30 | | | | 70 |
| 5 | 70 | 30 | | | | | 35 | 7 | 18 | | | | 40 |
| 6 | 40 | 60 | | | | | 20 | 4 | 36 | | | | 40 |
| 7 | 20 | 80 | | | | | 10 | 2 | 48 | | | | 40 |
| 8 | 5 | 80 | 15 | | | | 2.5 | 0.5 | 48 | | | | 49 |
| 9 | 5 | 5 | 90 | | | | 2.5 | 0.5 | 3 | | | | 94 |
| 10 | 1 | 80 | 19 | | | | 0.5 | 0.1 | 48 | | | | 51.4 |
| 11 | 1 | 30 | 69 | | | | 0.5 | 0.1 | 18 | | | | 81.4 |
| 12 | 40 | 1 | 59 | | | | 20 | 4 | 0.6 | | | | 75.4 |
| 13 | 40 | 15 | 45 | | | | 20 | 4 | 9 | | | | 67 |
| 14 | 40 | 30 | 30 | | | | 20 | 4 | 18 | | | | 58 |
| 15* | 40 | | 15 | 45 | | | 20 | 4 | | 18 | | | 58 |
| 16* | 40 | | 30 | | 30 | | 20 | 4 | | | 18 | | 58 |
| 17* | 40 | | 30 | | | 30 | 20 | 4 | | | | 18 | 58 |

Notes;
*marked one: comparing sample,
MF: metal conductive fiber, LM: low melting point metal, VGCF: vapor-phase grown carbon fiber, CB: conductive carbon black, GR: powdery graphite, PACF: PAN-group carbon fiber, SR: thermoplastic synthetic resin Next, in regard to each of the composites having compounding compositions as shown in Table 1, each of plate-shaped samples 1 to 17 with a dimension of 150 mm×150 mm×2 mm is molded by injection molding, and each of their electrical resistivities (Ωcm) is measured thereon. Further, in use of an electromagnetic shielding effect measuring device (MA8602A, manufactured by Anritsu Corp.) having the construction as shown in FIG. 1, damping factors (dB) of near-by electrical fields and damping factors (dB) of near-by magnetic fields are measured respectively to know the shielding effect. These results are also shown in Table 2.

TABLE 2

| No. | Moldability | Resitivity (Ωcm) | electrical field shielding effect (dB) 100 MHz | 400 MHz | 800 MHz | magnetic field shielding effect (dB) 100 MHz | 400 MHz | 800 MHz |
|---|---|---|---|---|---|---|---|---|
| 1* | G-D | | | | | | | |
| 2* | G-D | | | | | | | |
| 3* | G-A | $6 \times 10^{-4}$ | 82 | 51 | 16 | 25 | 23 | 20 |
| 4* | G-A | $2 \times 10^{1}$ | 31 | 25 | 23 | 5 | 5.5 | 6 |
| 5 | G-D | | | | | | | |
| 6 | G-B | $1 \times 10^{-4}$ | >100 | 92 | 84 | 75 | 73 | 70 |
| 7 | G-C | $5 \times 10^{-3}$ | 78 | 65 | 60 | 35 | 56 | 65 |
| 8 | G-B | $8 \times 10^{-2}$ | 60 | 50 | 50 | 11 | 21 | 30 |
| 9 | G-A | $>10^{4}$ | 0 | 0 | 0 | 0 | 0 | 0 |
| 10 | G-B | $1 \times 10^{-1}$ | 55 | 48 | 49 | 9 | 19 | 28 |
| 11 | G-A | $3 \times 10^{2}$ | 0 | 0 | 0 | 0 | 0 | 0 |
| 12 | G-A | $6 \times 10^{-4}$ | 82 | 51 | 20 | 24 | 22 | 20 |
| 13 | G-A | $4 \times 10^{-4}$ | 95 | 80 | 75 | 70 | 68 | 65 |
| 14 | G-A | $2 \times 10^{-4}$ | >100 | 88 | 79 | 73 | 70 | 68 |
| 15* | G-C | $2 \times 10^{-1}$ | 52 | 45 | 46 | 15 | 18 | 17 |
| 16* | G-A | $5 \times 10^{-4}$ | 85 | 56 | 27 | 26 | 23 | 22 |
| 17* | G-B | $2 \times 10^{-3}$ | 79 | 67 | 55 | 35 | 37 | 35 |

Note;
*marked samples are comparative ones,
G-A: moldable in wide molding conditions, G-B: moldable, G-C: insufficient dispersion, insufficient mixing, insufficient welding, occurrence of crack, or the like, G-D: not moldable Referring to these results, if only a metal conductive fiber is mixed, the electromagnetic shielding effect decreases in a high-frequency range. If only a vapor-phase grown carbon fiber is mixed, the electromagnetic shielding effect is uniform in a wide frequency range but its level is lower, and, when the mixing quantity is increased in order to get a higher electromagnetic shielding effect, the moldability tends to deteriorate. While, when both of a metal conductive fiber and a vapor-phase grown carbon fiber are used together, a superior electromagnetic shielding effect is obtained in a wide frequency range without any deteriorations of the moldability. If, in place of the vapor-phase grown carbon fiber, a conductive carbon black or a PAN-group carbon fiber is utilized, its mixing quantity to obtain a sufficient electromagnetic shielding effect deteriorates the moldability, wherein even the use of a powdery graphite can not improve any of electromagnetic shielding effects.

The electromagnetic shielding composite according to the present invention comprises a thermoplastic synthetic resin mixed with a metal conductive fiber, a low melting point metal, and a vapor-phase grown carbon fiber, having a superior electromagnetic shielding effect in a wide frequency range, and also their relatively small mixing quantity keeps a good moldability so as to have an advantage of a production of a molded article being light in weight and having a superior electromagnetic shielding effect.

What is claimed is:

1. An electromagnetic shielding composite comprising:

a thermoplastic synthetic resin mixed with a first metal conductive fiber, a second metal, having a melting point between a temperature at which said resin can be molded and a temperature at which said composite is used for electromagnetic shielding, and a vapor-phase grown carbon fiber.

2. An electromagnetic shielding composite according to claim 1 wherein said composite comprises based on the total weight of said composite, 40 to 90% of said thermoplastic synthetic resin 0.5 to 30% of said first metal conductive fiber and 0.5 to 50% of said vapor-phase grown carbon fiber.

3. An electromagnetic shielding composite according to claim 1 wherein said thermoplastic synthetic resin is mixed with said second metal in 0.05–0.3 weight ratio with respect to the weight of said metal conductive fiber.

4. An electromagnetic shielding composite according to claim 1 wherein said vapor-phase grown carbon fibers are fibers which are about 10–500 μm in length and about 0.1–1 μm in diameter.

5. An electromagnetic shielding composite according to claim 1 wherein said first metal conductive fiber comprises at least one conductive metal selected from the group consisting of copper, brass, aluminum, nickel, and stainless steel, or at least one inorganic material, selected from the group consisting of glass and potassium titanate, wherein the surface of the fiber comprising said inorganic material is metallized with at least one of said conductive metals.

6. An electromagnetic shielding composite according to claim 5 wherein said first metal conductive fiber is not longer than 10 mm and its average diameter is 5–100 μm.

7. An electromagnetic shielding composite according to claim 1 wherein said second metal is at least one of tin or tin-lead alloys.

8. An electromagnetic shielding composite according to claim 1 wherein said second metal has a melting point of 100°–250° C.

9. An electromagnetic shielding composite according to claim 1 wherein said vapor-phase grown carbon fiber is made from one of aromatic or aliphatic hydrocarbon compounds.

10. An electromagnetic shielding composite according to claim 1 wherein said thermoplastic synthetic resin is at least one resin selected from the group consisting of polyethylene, polypropylene, polystyrene, polyvinyl halide, polyacrylate, ABS, polyphenylene oxide, polyester, and poly-carbonate.

11. An electromagnetic shielding composite according to claim 1 wherein an additive such as an anti-oxidizing agent, a pigment, or a filler, is added to said composite.

12. An electromagnetic shielding composite according to claim 1 additionally comprising a flux in an amount sufficient to induce better wettability of said second metal and said first metal conductive fiber.

13. A method for manufacturing an electromagnetic shielding composite comprising the steps of:

a low melting point metal is preliminary fusion-bonded on a surface of a metal conductive fiber, which is mixed with a part of a thermoplastic synthetic resin to obtain a master batch; and said master batch is mixed with another master batch which is a mixture of a vapor-phase grown carbon fiber and a part of a thermoplastic synthetic resin, so as to produce said composite.

* * * * *